(12) United States Patent  
Dreher

(10) Patent No.: US 8,316,548 B2  
(45) Date of Patent: Nov. 27, 2012

(54) HAND-HELD ELECTRICAL SHEARS

(75) Inventor: Ernst Dreher, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 13/232,539

(22) Filed: Sep. 14, 2011

(65) Prior Publication Data

US 2012/0017448 A1    Jan. 26, 2012

Related U.S. Application Data

(63) Continuation of application No. 12/161,196, filed as application No. PCT/EP2007/060580 on Oct. 5, 2007, now Pat. No. 8,069,572.

(30) Foreign Application Priority Data

Oct. 12, 2006  (DE) .................. 10 2006 048 315

(51) Int. Cl.
*B26B 15/00* (2006.01)
*B26B 25/00* (2006.01)

(52) U.S. Cl. .............. 30/228; 30/240; 30/233; 83/520

(58) Field of Classification Search .............. 30/228, 30/240, 233, 123, 377, 388–391, 372, 373, 30/501, 514, 205, 206, 263; 173/20, 170; 362/119; 83/520

See application file for complete search history.

(56) References Cited

U.S. PATENT DOCUMENTS

| | | | |
|---|---|---|---|
| 1,796,463 A * | 3/1931 | Voigt et al. | 30/240 |
| 3,906,629 A * | 9/1975 | Fuchs, Jr. | 30/240 |
| 4,974,475 A * | 12/1990 | Lord et al. | 81/57.13 |
| 4,976,034 A * | 12/1990 | Whitman | 30/370 |
| 5,903,815 A * | 5/1999 | Scott | 428/564 |
| 6,012,350 A * | 1/2000 | Mizuta et al. | 74/434 |
| 6,326,710 B1 * | 12/2001 | Guenther et al. | 310/77 |
| 6,732,606 B1 * | 5/2004 | Zhu et al. | 74/460 |
| 2001/0029819 A1 * | 10/2001 | Okouchi | 83/13 |
| 2002/0070037 A1 * | 6/2002 | Jasch | 173/132 |
| 2002/0121024 A1 * | 9/2002 | Stielper | 30/391 |
| 2003/0041717 A1 * | 3/2003 | Evenson | 83/663 |
| 2003/0181152 A1 * | 9/2003 | Hofmann et al. | 451/342 |
| 2007/0120527 A1 * | 5/2007 | Roehm et al. | 320/114 |
| 2007/0256914 A1 * | 11/2007 | Lohr et al. | 200/5 A |

* cited by examiner

*Primary Examiner* — Phong Nguyen
(74) *Attorney, Agent, or Firm* — Michael J. Striker

(57) ABSTRACT

Hand-held electrical shears has a housing with a tool head and a grip part, an electric motor, a drive shaft driven by the electric motor via a transmission, a rotatable tool mounted on the drive shaft, and a rechargeable energy accumulator in the grip part. The transmission and a portion of the electric motor are in the tool head, an actuating element of an on/off switch is on an underside of the grip part, a grip cover is attached to a top side of the grip part. A shaft end section extending laterally out of the housing carries a bearing flange with a driving element for the tool, and a blade retaining plate with a counter-blade and a supporting base are detachably attached in a flattened region of the housing.

26 Claims, 4 Drawing Sheets

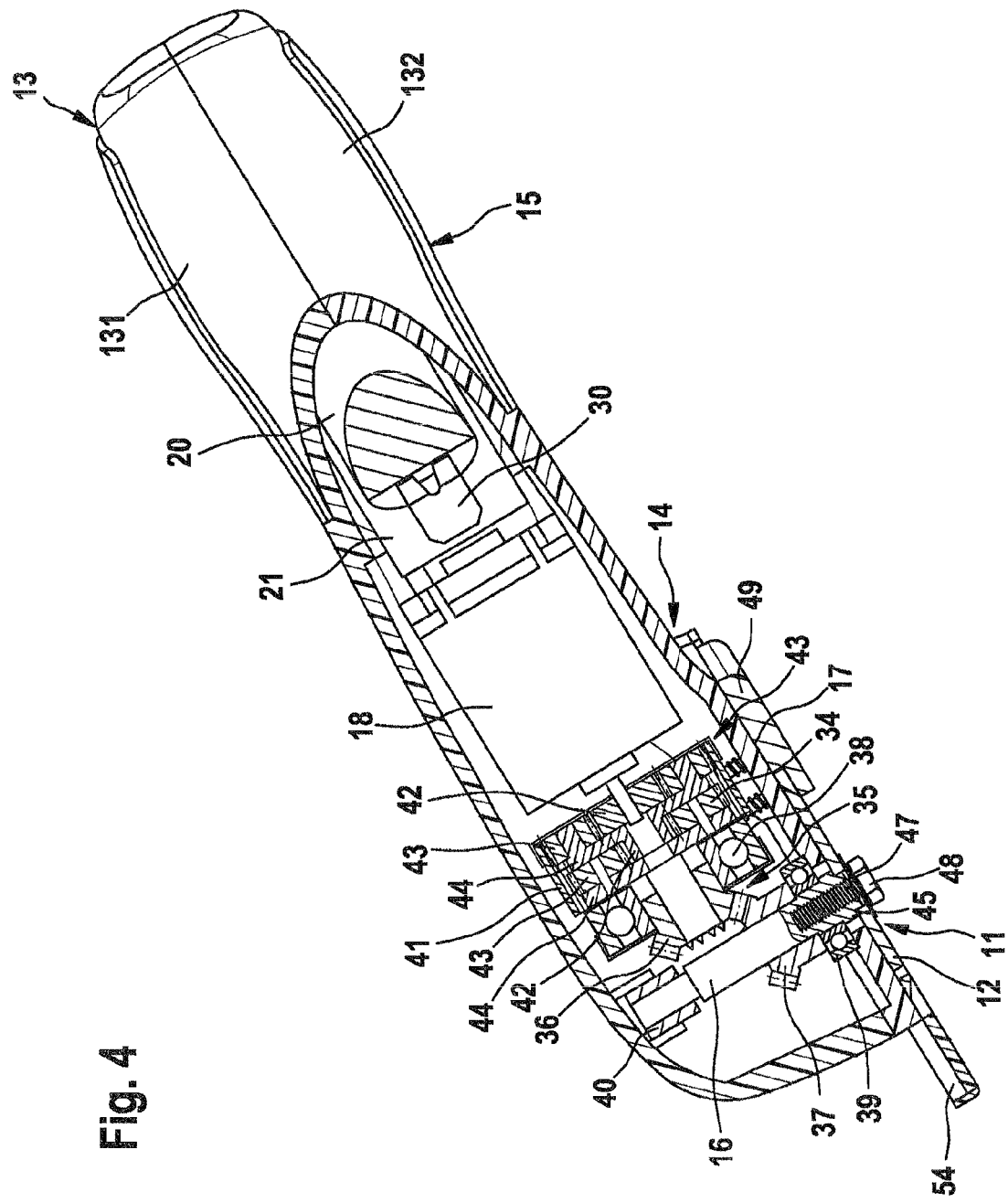

and is held in an "off"
HAND-HELD ELECTRICAL SHEARS

CROSS-REFERENCE TO RELATED APPLICATION

The present application is a continuation of U.S. patent application Ser. No. 12/161,196 filed on Jul. 17, 2008 now U.S. Pat. No. 8,069,572.

The invention described and claimed hereinbelow is also described in International Patent Application PCT/EP2007/060580 filed on Oct. 5, 2007 and in German Patent Application DE 10 2006 048 315.4 filed on Oct. 12, 2006.

The above-identified applications, whose subject matter is incorporated here by reference, provide the basis for a claim of priority of invention under 35 U.S.C. 119(a)-(d).

BACKGROUND OF THE INVENTION

The present inventions relates to a hand-held electrical shears.

Known electrical shears for cutting sheet material, such as cloth, paper and cardboard webs and the like (SU 1 768 384 A1), include a longitudinal housing with a tool head and a grip part. A drive shaft, which is oriented transversely to the housing longitudinal axis and extends laterally out of the tool head, is supported in the tool head. A disk-shaped polygonal cutting disk is non-rotatably accommodated on the drive shaft. The upper—as viewed in the working position—edge of the polygonal cutting disk is covered by a protective collar—which is formed on the housing—around a circumferential angle that is greater than 180°. A downwardly extending, angular blade holder is attached to the tool head, which carries a counter-blade that interacts with the cutting disk, and on which a supporting base is formed that is located opposite to the lower edge region of the cutting disk. The blade holder is located on the housing such that the supporting surface of the supporting base and the longitudinal axis of the housing form an acute angle. An electric motor and a transmission for driving the drive shaft on which the cutting disk is mounted are located in the grip part. Power is supplied to the electric motor via an electrical device cable.

SUMMARY OF THE INVENTION

Accordingly, it is an object of the present invention to provide a hand-held power tool, in particular hand-held electrical shears, which is a further improvement of the existing hand-held power tools of this type.

The inventive hand-held power tool, in particular electrical shears, has the advantage that it is compact, small in size, and lightweight, thereby enabling a user to operate it without becoming tired.

The housing is composed only of the tool head and the grip part designed as one piece therewith, and it accommodates all necessary components, including the wireless power supply. The displacement of the electric motor and the transmission into the tool head creates space for the energy accumulator and the electronics, and it moves the center of gravity of the hand-held power tool very far downward into the tool head and, therefore, closer to the work piece, which improves the handling ergonomics.

The ergonomics are also greatly improved by the fact that, according to a preferred embodiment of the present invention, the housing is designed such that it curves like a banana, thereby resulting in the grip part being located—in an ergonomically favorable position—at a distinct distance away from the surface of the work piece to be machined, so that the fingers of the operator of the hand-held power tool may never come in contact with the surface of the work piece while work is being performed.

All of the measures regarding the design and placement of the machine components and components of the hand-held power tool contribute to a smaller space and a lighter weight of the hand-held power tool, and ensure that the machine may be manufactured in a cost-favorable manner, which keeps the overall costs low.

The inventive hand-held power tool is described in greater detail in the description below with reference to an exemplary embodiment shown in the drawing.

BRIEF DESCRIPTION OF THE DRAWINGS

FIG. 4 shows a sectional view along the line IV-IV in FIG. 3.

DESCRIPTION OF THE PREFERRED EMBODIMENTS

Figure 1:
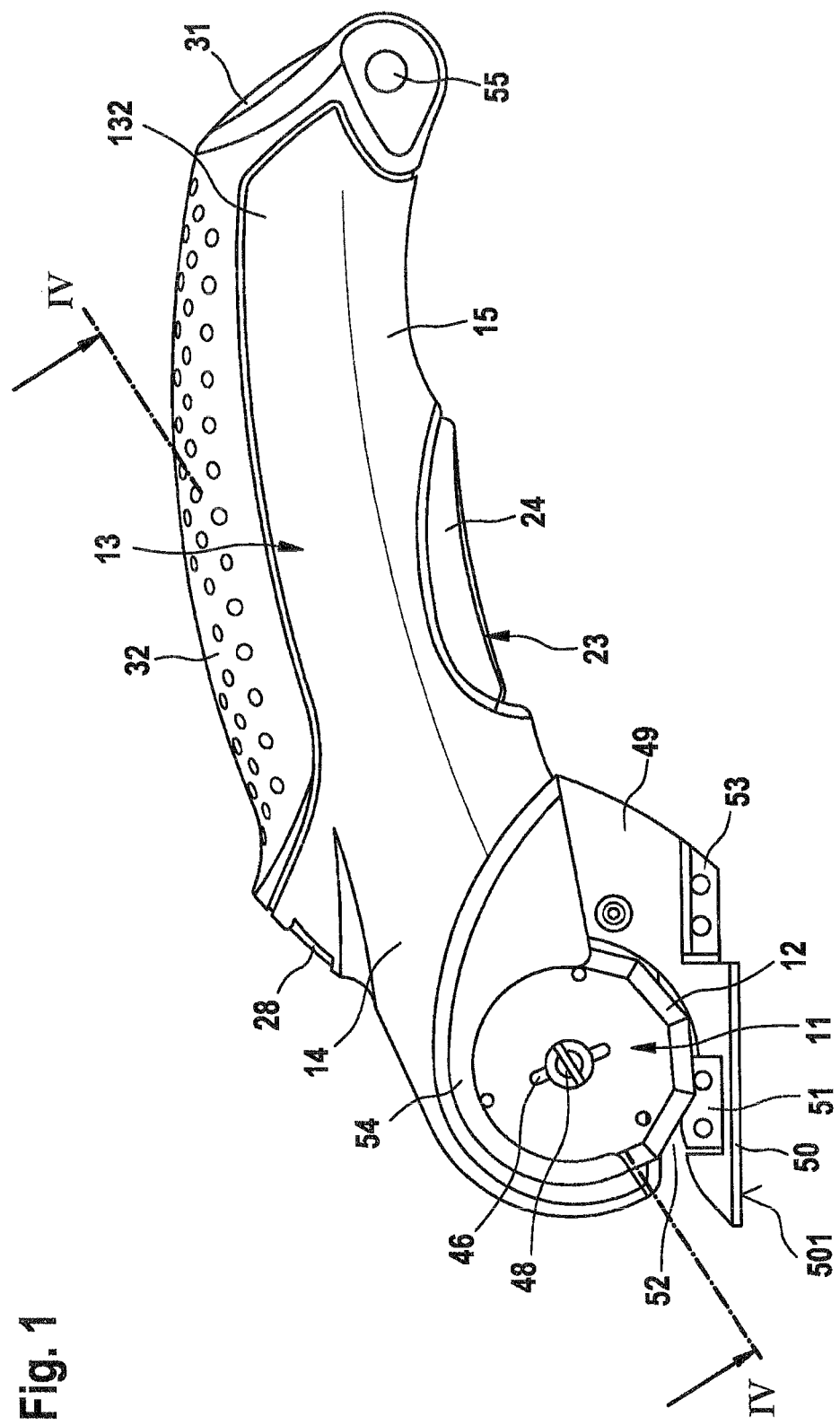
FIG. 1 shows a side view of electrical shears.

The hand-held electrical shears—which are also referred to as an electrical multipurpose blade, and which are depicted in various views and cross sections in the drawing—serves as an exemplary embodiment of a general hand-held power tool with a rotating tool, which may be a cutting disk or a circular saw blade. In the exemplary embodiment of the electrical shears, disk-shaped rotatable tool 11 is a polygonal cutting disk 12, specifically a 10-sided cutting disk. The electrical shears include a housing 13, which is composed of two housing shells 131, 132. Housing 13 includes a tool head 14, on the side of which rotatable tool 11 is located, and a grip part 15 adjacent thereto.

Figure 2:
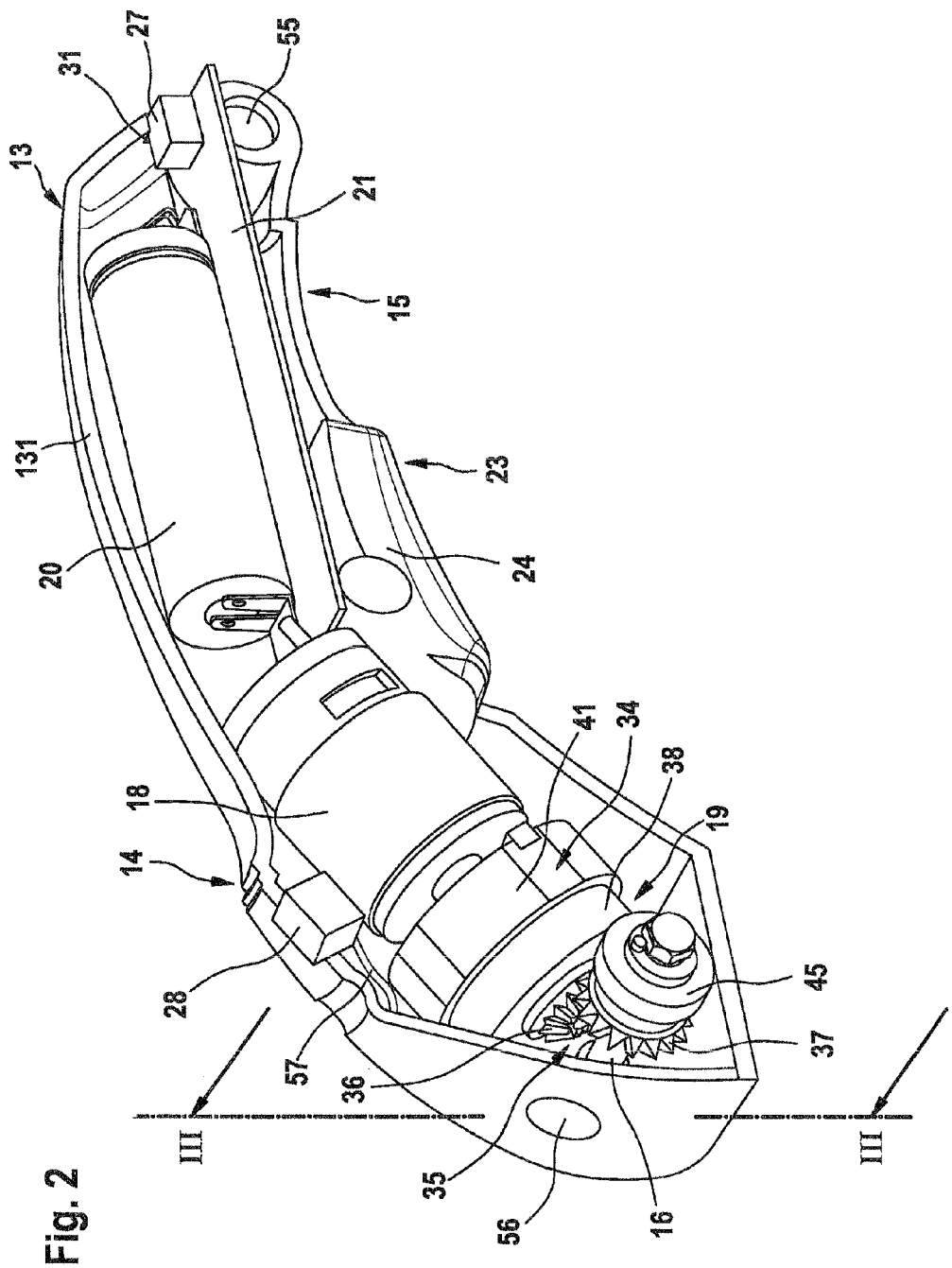
FIG. 2 shows a perspective side view of the electrical shears in FIG. 1 after removal of a housing shell of the housing and a grip cover.

Tool head 14 and grip part 15 are connected with each other as one piece, so that each housing shell 131,132 forms a part of tool head 14 and grip part 15. A drive shaft 16 that is oriented transversely to the housing longitudinal axis is rotatably supported in tool head 14, and extends with a projecting end out of tool head 14 in a flattened region 17 (FIG. 4) of front housing shell 132 in FIG. 1 and accommodates rotatable tool 11 in this case. Drive shaft 16 is driven in a rotary manner by an electric motor 18 via a transmission 19 (FIG. 2). Transmission 19 and electric motor 18 are located in tool head 14. Electric motor 18 is powered by a chargeable, small-volume energy accumulator 20 with a high charging capacity.

Figure 3:
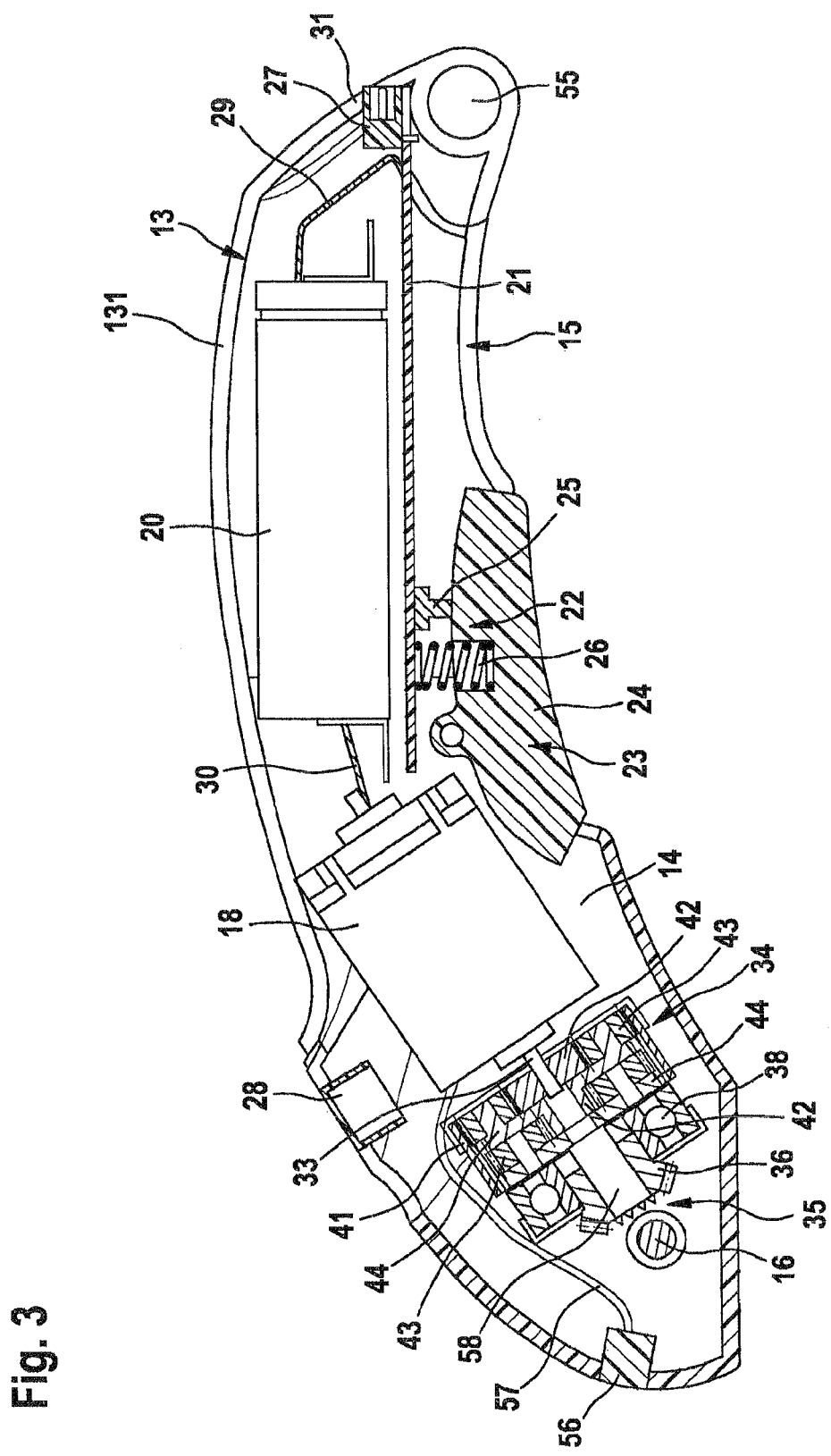
FIG. 3 shows a longitudinal sectional view of the electrical shears along the cutting plane labelled III-Ill in FIG. 2.

A lithium-ion rechargeable battery is preferably used as an energy accumulator of this type. The energy accumulator will therefore be referred to below simply as a rechargeable battery 20. Rechargeable battery 20 is integrated—along with an electronics printed circuit board 21 and an on/off switch 22 for the hand-held power tool—in grip part 15 of housing 13. Rechargeable battery 20 is located above electronics printed circuit board 21. An on/off switch 22 is composed of a not-shown electrical switch that is located in the circuit of rechargeable battery 20 and electric motor 18 and on electronics printed circuit board 21, and it is composed of an actuating element 23 that is designed as a large-area button 24 that projects from the underside of grip part 15 and actuates the electrical switch via a plunger 25 located on the underside of electronics printed circuit board 21 (FIG. 3). Button 24 is pivotably supported in grip part 15 and is held in an "off"

position of on/off switch 22 via a return spring 26. The pivot support of button 24 advantageously results in short travel for the electrical switch and in long travel for return spring 26. Due to the large surface area of button 24, the operator may actuate on/off switch 22 in an ergonomically advantageous manner.

A circuit for charging and monitoring the state of charge of rechargeable battery 20 is located on electronics printed circuit board 21. A charging socket 27, which is mounted on electronics printed circuit board 21 and is accessible—via a recess 31 located on the rear end of grip part 15—to a charging plug of a charging device, is connected with the circuit. A start-of-charge display 28, which is also connected with the circuit, is located in a region of housing 13 that is visible to the operator when the electrical shears are held in the working position. In the exemplary embodiment shown, state-of-charge display 28 is located on the top side of the end of tool head 14 that faces grip part 15 (FIGS. 1 through 3). Rechargeable battery 20 is contacted with electronics printed circuit board 21 via terminals 29, and electric motor 18 is contacted with electronics printed circuit board 21 via terminals 30. A grip cover 32 with a golf ball-type structure is attached to the top side of grip part 15, which faces away from button 24 (FIG. 1). Grip cover 32 ensures that the electrical shears may be held and guided in a secure manner without slipping.

Transmission 19, which is located in tool head 14, is composed of a reduction gear and a deflecting gear, which are located downstream in the power flow (FIGS. 3 and 4). A transmission design of this type is very compact. The reduction gear is designed as a multi-staged—two-staged in the present exemplary embodiment—planetary gear set 34 with an input stage and an output stage. The deflecting gear is designed as a bevel gear set 35, which includes two meshed bevel gears 36, 37, whose gear axes are oriented at right angles to each other. The input stage of planetary gear set 34 is coupled to motor shaft 33 of electric motor 18, and the output stage of planetary gear set 34 is coupled to first bevel gear 36 of bevel gear unit 35. Bevel gears 36, 37 have the same number of teeth and are made of brass. First bevel gear 36 is accommodated in a ball bearing 38 mounted in housing 13, and second bevel gear 37 is pressed onto drive shaft 16. Drive shaft 16 itself is supported on one side in a ball bearing 39, which serves as a fixed bearing, and in a sintered bushing 40 on the other side (FIG. 4). Sintered bushing 40 is pressed into housing shell 131, and ball bearing 39 is pressed into housing shell 132.

In planetary gear set 34, all gear stages share the same internal gear 41, which is mounted in housing 13, and which extends across the axial length of planetary gear set 34. Each gear stage includes a sun gear 42, with planetary gears 43 (three planetary gears 43 in the exemplary embodiment) that mesh with sun gear 42 and internal gear 41, and a planetary gear carrier 44 that carries planetary gears 43. Sun gear 42 of the input stage is inserted on motor shaft 33 in a driving manner, while sun gear 42 of the output stage is part of planetary gear carrier 44 of the input stage. If planetary gear set 35 has more than two gear stages, sun gear 42 of the next gear stage is mounted on each planetary gear carrier 44, or it is designed as a single piece therewith. If there are three gear stages, sun gear 42 of the middle gear stage would be combined with planetary gear carrier 41 of the input stage, and sun gear 42 of the output stage would be combined with planetary gear carrier 44 of the middle gear stage.

Planetary gear carrier 44 of the output stage is fixed on a peg-type output shaft 58, on which first bevel gear 36 of bevel gear unit 35 is non-rotatably mounted. Planetary gears 43 of the gear stages are made of sintered steel, and internal gear 41 is a sintered part, aspects that reduce weight and costs. The shaft section of drive shaft 16, which extends laterally out of housing 13—specifically, out of housing shell 132—in flattened region 17 of tool head 14 includes a bearing flange 44 (FIGS. 2 and 4) with an integral driving element 46 (FIG. 1) for rotatable tool 11. An axial threaded bore 47 that is formed from the free end face inward is provided in drive shaft 16. A panhead screw 48 (FIGS. 1 and 4) is screwed into threaded bore 47, thereby securing disk-shaped, rotatable tool 11—a polygonal cutting disk 12 in this case, and which bears non-rotatably against bearing flange 45—in the axial direction.

An angular blade retaining plate 49 is detachably attached (FIGS. 1 and 4) to housing 13—specifically, to housing shell 132—in flattened region 17, which is somewhat larger than the diameter of rotatable tool 11.

A supporting base 50 is formed on blade retaining plate 49, with which the electrical shears may be guided when cutting is performed on a guide plane. A rectangular counter-blade 51 is located nearly parallel with contact surface 501 of supporting base 50 and forms a wedge-shaped groove 52 (FIG. 1) with rotatable tool 11 and/or polygonal cutting disk 12, whose opening points in the working direction. Counter-blade 51 is riveted to a leaf spring 53, which is attached to the side of supporting base 50 that is not shown in FIG. 1.

Blade retaining plate 49 is detachably attached to housing shell 132 and may be replaced with a spring-loaded protective bracket, which is not shown here. This protective bracket covers the lower edge region of rotatable tool 11 and/or polygonal cutting disk 12 that is exposed by blade retaining plate 49, and ensures that the electrical shears may not be touched when they are not in use. Using this protective clamp, the electrical shears may be used to perform cutting work without counter-blade 51.

A guard 54 is also pivotably mounted on flattened region 17 of housing shell 132 (FIG. 1). Guard 54 covers the upper edge region of rotatable tool 11 that faces away from supporting base 50, so that it may not be touched. Guard 54 extends around a circumference of greater than 180°. Guard 54 is spring-loaded and, when the electrical shears are not in use, it slides over wedge-shaped gap 52, so that rotatable tool 11 is completely covered at the edge by supporting base 50 and guard 54. Via a lever mechanism or cable tension, guard 54 is coupled with on/off switch 22 such that, when button 24 is actuated to switch on electric motor 18, guard 54 in FIG. 1 is swiveled in the clockwise direction to the extent that wedge-shaped gap 52 between rotatable tool 11 and counter-blade 51 is exposed. As an alternative, guard 54 may also be integrally formed as a single piece with housing shell 132, in which case its coverage of rotatable tool 11 ends before wedge-shaped gap 52.

As shown in FIGS. 1 and 3, a suspension eye 55 is integrally formed with the rear end of housing 13, which faces away from tool head 15. Instead of a suspension eye 55, it is possible for set-down strip to be formed on housing 13.

As shown in FIGS. 2 and 3, at least one electrical lamp which is preferably designed as an LED 56—is located in the front side of tool head 15, which points in the working direction. LED 56 is connected via a connecting line 57 with electronics printed circuit board 21, where it is connected to the circuit. The electrical switch of on/off switch 22 is designed with two stages. When button 24 is actuated, the electrical switch moves into stage "1" and stage "2" in succession. In stage "1", LED 56 is switched on. In stage "2", in addition, the circuit between rechargeable battery 20 and electric motor 18 is closed. As an alternative, LED 56 may also be connected to a separate switch, which is accessible on housing 13, so that LED 56 may be switched on and off, independently of starting up the electrical shears. In this case, the electrical shears may also be used as a flashlight.

It will be understood that each of the elements described above, or two or more together, may also find a useful application in other types of constructions differing from the types described above.

While the invention has been illustrated and described as embodied in a hand-held power tool, in particular electrical shears, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A hand-held electrical shears, comprising:
a housing (13) that includes a tool head (14) and a grip part (15), wherein the housing curves like a banana and has a flattened region (17);
an electric motor (18) located in the housing (13);
a drive shaft (16) supported in the tool head (14) and driven by the electric motor (18) via a transmission (19);
a rotatable tool (11) mounted on the drive shaft (16), wherein a rechargeable energy accumulator having a high charging capacity and being a lithium-ion rechargeable battery (20) that supplies the electric motor (18) is integrated in the grip part (15) along with an electronics printed circuit board (21) and an on/off switch (22), and wherein the transmission (19) and at least a portion of the electric motor (18) are located in the tool head (14);
an actuating element (23) of the on/off switch (22) located on an underside of the grip part (15);
a grip cover (32) attached to a top side of the grip part (15), on a side opposite to the actuating element (23);
wherein the drive shaft (16) is accommodated in a ball bearing (39) on one side and in a sintered bushing (40) on the other side, wherein the housing (13) is composed of two housing shells (131, 132),
wherein the rotatable tool (11) is a disk, and the drive shaft (16) includes on a shaft end section that extends laterally out of the housing (13) a bearing flange (45) with an integral rotary driving element (46) for the rotatable tool (11),
wherein a blade retaining plate (49) with a counter-blade (51) that is retained thereon and interacts with a polygonal cutting disk (12), and a supporting base (50) are detachably attached in the flattened region (17) of the housing (13).

2. The hand-held electric shears as recited in claim 1, wherein an electrical switch of the on/off switch (22), a charging socket (27) that is accessible via a recess (58) in the housing (13), and a circuit system for charging and monitoring a state of charge of the energy accumulator (20) are located on the electronics printed circuit board (21), and wherein the energy accumulator (20) is located above the electronics printed circuit board (21), and is contacted via terminals (29) to the electronics printed circuit board (21).

3. The hand-held electric shears as recited in claim 2, wherein a state-of-charge display (28) that is visible on the housing (13) is connected with the electronics printed circuit board (21).

4. The hand-held electric shears as recited in claim 1, wherein the actuating element is a button (24) attached in the grip part (15) in a pivotable manner and retained in an "off" position of the on/off switch (22) by a return spring.

5. The hand-held electric shears as recited in claim 1, wherein the transmission (19), which is located in the tool head (14), includes a multi-stage planetary gear unit (34) with an input stage and an output stage, and a bevel gear unit (35) with two meshed bevel gears (36, 37) whose gear axes are oriented at right angles to each other, and wherein the input stage of the planetary gear unit (34) is coupled to the electric motor (18), the output stage of the planetary gear unit (34) is coupled to the first bevel gear (36) of the bevel gear set (35), and the second bevel gear (37) is mounted on the drive shaft (16).

6. The hand-held electric shears as recited in claim 5, wherein the multi-stage planetary gear unit (34) include a common internal gear (41) that is mounted in the housing (13) and extends across an axial length of the planetary gear set (34).

7. The hand-held electric shears as recited in claim 5, wherein the multi-stage planetary gear unit (34) includes a sun gear (42), planetary gears (43) that mesh with the sun gear (42) and the internal gear (41), and a planetary gear carrier (44) that carries the planetary gears (43), and wherein the sun gear (42) of the input stage is mounted on the motor shaft (33) of the electric motor (18), and the planetary gear carrier (44) of the output stage is fixedly connected with an output shaft (58) on which a bevel gear (36) is mounted.

8. The hand-held electric shears as recited in claim 7, wherein the sun gears (42) mounted on the planetary gear carriers (44) are designed as single pieces with the planetary gear carrier (44).

9. The hand-held electric shears as recited in claim 5, wherein the sun gear (42) of the input stage of the planetary gear unit (34) is inserted on the motor shaft (33) in drivable manner.

10. The hand-held electric shears as recited in claim 5, wherein the planetary gears (43) of at least one input stage of the planetary gear set (34) are of sintered steel.

11. The hand-held electric shears as recited in claim 5, wherein the internal gear (41) is a sintered part.

12. The hand-held electric shears as recited in claim 5, wherein the bevel gears (36, 37) of the bevel gear unit (35) have the same number of teeth.

13. The hand-held electric shears as recited in claim 5, wherein the bevel gears (36, 37) of the bevel gear unit (35) are of brass.

14. The hand-held electric shears as recited in claim 5, wherein the first bevel gear (36) is retained in a ball bearing (38), and the second bevel gear (37) is pressed onto the drive shaft (16).

15. The hand-held electrical shears as recited in claim 1, wherein the drive shaft (16) includes a threaded bore (47) formed from a free end face inward, and wherein the disk-shaped rotatable tool (11), which rests on the bearing flange (45), is secured axially by a cap screw that is screwed into the threaded bore (47).

16. The hand-held electrical shears as recited in claim 1, wherein the housing (13) is flattened in a region of a shaft end section of the drive shaft (16) that emerges from the housing (13), and wherein a guard (54) is installed on the housing (13) and extends at least across an upper edge region of the disk-shaped, rotatable tool (11).

17. The hand-held electric shears as recited in claim 16, wherein the guard (54) is integrally formed with one housing shell (132) of the housing (13).

18. The hand-held electric shears as recited in claim 16, wherein the guard (54) is retained on one housing shell (132) in a pivotable manner and extends across a front of the disk-shaped, rotatable tool (11) and is coupled with the on/off switch (22) for the electric motor (18) such that, when the on/off switch (22) is actuated to switch on the electric motor (18), the guard (54) is swiveled outwardly and exposes a front edge region of the rotatable tool (11).

19. The hand-held electrical shears as recited in claim 1, wherein at least one electrical lamp is located in a front side of the tool head (14), and points in a working direction.

20. The hand-held electrical shears as recited in claim 19, wherein the at least one electric lamp is switched on and off using a switch that is accessible manually on the housing (13).

21. The hand-held electrical shears as recited in claim 19, wherein an electric switch of the on/off switch (22) has two stages and in its first switch position it switches the at least one lamp, while in its second switch position it closes an electric circuit for the electric motor (18).

22. The hand-held electrical shears as defined in claim 15, wherein the cap screw is a panhead screw (48).

23. The hand-held electrical shears as defined in claim 19, wherein the at least one electric lamp is an LED (56).

24. The hand-held electrical shears as defined in claim 1, wherein the actuating element is a projecting, large-area button (24) formed on the grip part (15).

25. The hand-held electrical shears as defined in claim 1, wherein the ball bearing (39) is pressed into one housing shell (133) and the sintered bushing is pressed into the other housing shell (131).

26. The hand-held electrical shears as defined in claim 1, wherein the disk-shaped, rotatable tool (11) is a polygonal cutting disk (12).

* * * * *